US012792960B2

(12) United States Patent
Alon et al.

(10) Patent No.: US 12,792,960 B2
(45) Date of Patent: Nov. 10, 2026

(54) LEARNING TOKEN IMPORTANCE USING MULTI-MODEL STOCHASTIC SPARSITY INDUCING REGULARIZATION

(71) Applicant: Google LLC, Mountain View, CA (US)

(72) Inventors: Dana Alon, Mountain View, CA (US); Yair Alon, Mountain View, CA (US); Elad Eban, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 451 days.

(21) Appl. No.: 18/293,638

(22) PCT Filed: Sep. 3, 2021

(86) PCT No.: PCT/US2021/049107
§ 371 (c)(1),
(2) Date: Jan. 30, 2024

(87) PCT Pub. No.: WO2023/033838
PCT Pub. Date: Mar. 9, 2023

(65) Prior Publication Data
US 2024/0330762 A1 Oct. 3, 2024

(51) Int. Cl.
*G06N 20/00* (2019.01)

(52) U.S. Cl.
CPC .................................... *G06N 20/00* (2019.01)

(58) Field of Classification Search
CPC ...... G06N 20/00; G06N 3/0455; G06N 3/084; G06F 40/30
See application file for complete search history.

(56) References Cited

PUBLICATIONS

Zhao, Xiangyu et al., "Memory-efficient Embedding for Recommendations," arXiv:2006.14827v2 [cs.IR], Oct. 21, 2020, 12 pages. (Year: 2020).*
Louizos, Christos et al., "Learning Sparse Neural Networks through L0 Regularization," arXiv:1712.01312v2 [stat.ML], Jun. 22, 2018 (published as a conference paper at ICLR 2018), 13 pages. (Year: 2018).*
Ginart, A.A. et al., "Mixed Dimension Embeddings with Application to Memory-Efficient Recommendation Systems," arXiv:1909.11810v3 [cs.LG], Feb. 8, 2021, 16 pages. (Year: 2021).*
(Continued)

*Primary Examiner* — Kc Chen
(74) *Attorney, Agent, or Firm* — Fish & Richardson P.C.

(57) ABSTRACT

Methods, systems, and apparatus, including computer programs encoded on a computer storage medium, for improving the representation of items of a vocabulary in an embedding space for use in machine learning models. An embedding matrix is generated wherein each row in the embedding matrix is a vector of elements and corresponds to an item of a vocabulary. A score is assigned to each vector in the embedding matrix indicating a probability of its corresponding vector being used in the machine learning model. The scores are iteratively updated by sampling a proper subset of vectors and updating the elements of each respective vector in the proper subset of vectors based on the respective scores of vectors. The score of each vector are then updated based on a loss function of the machine learning model. The embedding matrix is then re-structured based on the updated scores of the vectors.

18 Claims, 5 Drawing Sheets

(56) References Cited

PUBLICATIONS

Atuncar et al., "Strong consistency of Kernel density estimates for Markov chains failure rates," Statistical Inference for Stochastic Processes, Jul. 2006, 11(1):1-10.
Bansal et al., "Nonparametric estimation of structural models for high-frequency currency market data," Journal of Econometrics, Mar.-Apr. 1995, 66(1-2):251-287.
Bontemps et al., "Equilibrium search with continuous productivity dispersion: theory and nonparametric estimation," International Economic Review, Dec. 2001, 41(2):305-358.
Brekke et al., "Optimal switching in an economic activity under uncertainty," SIAM Journal on Control and Optimization, Jul. 1994, 32(4):1021-1036.
Brennan et al., "Evaluating natural resource investments," The Journal of Business, Apr. 1985, 58(2):135-157.
Burr, "Subsidies, tariffs and investments in the solar power market." University of Colorado-Boulder Working Paper, Sep. 2014, 58 pages.
Caldecott et al., "Stranded generation assets: Implications for European capacity mechanisms, energy markets and climate policy," Working paper, University of Oxford, Jan. 2014, 62 pages.
Chaudhuri et al., "Fine-Grained Stochastic Architecture Search" CoRR, Submitted on Jun. 2020, arXiv:2006.09581v1, 13 pages.
Energy Information Administration "Annual Energy Outlook 2009" (DOE/EIA-0554(2009), Mar. 2009, 230 pages.
Fleten et al., "Keeping the lights on until the regulator makes up his mind," Midwest Finance Association 2012 Annual Meetings Paper, Working paper, Nov. 2012, 37 pages.
Gamba et al., "Structural estimation of real options models," Journal of Economic Dynamics & Control, 33(4), Sep. 2008, 42 pages.
Guerre et al., "Optimal nonparametric estimation of first-price auctions." Econometrica 68.3, May 2000, 525-574.
International Preliminary Report on Patentability in International Appln. No. PCT/US2021/049107, mailed on Mar. 5, 2024, 8 pages.
International Search Report and Written Opinion in International Appln. No. PCT/US2021/049107, mailed on May 16, 2022, 13 pages.
Kellogg, "The effect of uncertainty on investment: Evidence from Texas oil drilling," American Economic Review, Jun. 2014, 104(6):1698-1734.
Kenyon et al., "Real options in leasing: The effect of idle time" Operations Research, 2001, 49(5):675-689.
King et al., "Logistic regression in rare events data," Political Analysis, Feb. 2001, 9(2):137-163.
Kwon, "Invest or exit? optimal decisions in the face of a declining profit stream" CoRR, Submitted on Jan. 2019, arXiv:1901.01486v1, 32 pages.
Lai et al., "Valuation of storage at a liquefied natural gas terminal" Operations Research, Jun. 2011, 59(3):602-616.
Li et al., "Structural estimation of the affiliated private value auction model" RAND Journal of Economics, 2002, 171-193.
McFadden, "Conditional logit analysis and qualitative choice behavior" Working Paper No. 199/BART 10, Nov. 1972, 58 pages.
Moel et al., "When are real options exercised? an empirical study of mine closings" Review of Financial Studies, Jan. 2002, 15(1):35-64.
Muehlenbachs, "A dynamic model of cleanup: Estimating sunk costs in oil and gas production" International Economic Review, 2015, 56(1):155-185.
Nadarajah, "Linear combination of gumbel random variables" Stochastic Environmental Research and Risk Assessment, 2007, 21(3):283-286.
Newey et al., "Nonparametric estimation of triangular simultaneous equations models" Econometrica, 1999, 67(3):565-603.
Pagès, "A space quantization method for numerical integration" Journal of Computational and Applied Mathematics, 89(1):1-38, 1998, 37 pages.
Rapson, "Durable goods and long-run electricity demand: Evidence from air conditioner purchase behavior" Journal of Environmental Economics and Management, 2014, 68(1):141-160.
Rothwell et al., "On the optimal lifetime of nuclear power plants" Journal of Business & Economic Statistics, 15 (2), 1997, 35 pages.
Rust et al., "Optimal response to a shift in regulatory regime: The case of the US nuclear power industry" Journal of Applied Econometrics, 1995, S75-S118.
Rust, "Optimal replacement of GMC bus engines: An empirical model of Harold Zurcher" Econometrica, Sep. 1987, 55(5):999-1033.
Singh, "Word Embedding," Medium, Oct. 2017, 13 pages.
Smith et al., "Valuing oil properties: integrating option pricing and decision analysis approaches" Operations Research, 1998, 46(2):198-217.
Strebulaev et al., "Dynamic models and structural estimation in finance" Foundations and Trends in Finance, Dec. 2012, 159 pages.
Su et al., "Constrained optimization approaches to estimation of structural models" Econometrica, 80, 2012, 39 pages.
Thome et al., "Investment in corn-ethanol plants in the Midwestern United States" Working paper, Cornell University, Oct. 2015, 52 pages.
Wikipedia.org [online], "Gumbel Distribution" created on Jul. 2003, retrieved on Aug. 16, 2024, retrieved from URL <https://en.wikipedia.org/wiki/Gumbel_distribution>, 7 pages.
Wsj.com [online], "Hawaii wrestles with vagaries of a green grid" Jun. 29, 2015, retrieved on Aug. 16, 2024, retrieved from URL <https://www.wsj.com/articles/hawaii-wrestles-with-vagaries-of-solar-power-1435532277>, 3 pages.

* cited by examiner

LEARNING TOKEN IMPORTANCE USING MULTI-MODEL STOCHASTIC SPARSITY INDUCING REGULARIZATION

CROSS-REFERENCE TO RELATED APPLICATION

This application is a National Stage Application under 35 U.S.C. § 371 and claims the benefit of International Application No. PCT/US2021/049107, filed Sep. 3, 2021, the disclosure of which is incorporated herein by reference.

BACKGROUND

This specification relates to data processing and improving the representation of embeddings in machine learning models.

An embedding is a relatively low-dimensional space that can be used to translate high-dimensional vectors. In some applications, embeddings make it easier for applying machine learning techniques on large inputs like sparse vectors representing items such as words or features of a vocabulary. Ideally, an embedding captures some of the semantics of the input by placing semantically similar inputs close together in the embedding space. An embedding can be learned and reused across models.

SUMMARY

This specification describes techniques and methods for improving the representation of items of a vocabulary in an embedding space for use in machine learning models. As used in this specification, a "vocabulary" is a set of items that is dependent on the domain in which the machine learning model is used. For example, if the domain is language, a vocabulary can include a portion of a word, a full word, or an n-gram. Conversely, if the domain is images, a vocabulary can include pixels, colors, edges and hues.

In general, one innovative aspect of the subject matter described in this specification can be embodied in methods that include the actions of generating an embedding matrix for a machine learning model, the embedding matrix defining a plurality of rows, wherein each row in the embedding matrix is a vector of elements and corresponds to an item of a vocabulary; assigning, to each vector in the embedding matrix, a score, each score being a probability of its corresponding vector being used in the machine learning model; updating vectors in the embedding matrix, wherein the updating comprises iteratively processing the vectors of the embedding matrix, and for each iteration: sampling, from the vectors of the embedding matrix, a proper subset of vectors for the iteration; updating the elements of each respective vector in the proper subset of vectors based on the respective scores of the proper subset of vectors; updating the score of each vector in the proper subset of vectors based on a loss function of the machine learning model; and re-structuring the embedding matrix based on the updated scores of the vectors in the embedding matrix wherein for a plurality of the iterations, different proper subsets of vectors are selected.

Other embodiments of this aspect include corresponding systems, apparatus, and computer programs, configured to perform the actions of the methods, encoded on computer storage devices.

Methods can include updating the elements of each respective vector in the proper subset of vectors by sampling a value based on the score of the respective vector; and multiplying each element in the vector by the value.

Methods can include sampling the value comprises sampling using Gumbel Softmax Trick based on the score.

Methods can include re-structuring the embedding matrix by identifying a first proper subset of vectors from the vectors in the embedding matrix based on the score of each vector; creating a first embedding matrix that comprises the first proper subset of vectors; and creating a second embedding matrix that comprises vectors from the embedding matrix that are not in the first proper subset of vectors.

Methods can include the first embedding matrix not having a compressed representation of the first proper subset of vectors from the embedding matrix and the second embedding matrix having a compressed representation of the vectors from the embedding matrix that are not in the first proper subset of vectors.

Methods can include the training process of the machine learning model including a loss function L that can be represented as $$L = L_a + \alpha \sum_i^N p_i$$

where $L_a$ is a task specific loss of the machine learning model, $\alpha$ is the regularization parameter and $p_i$ is the score of the i-th item among the N items of the embedding matrix during the training step.

Methods can further include updating the vectors by performing additional iterations on additional proper subsets of vectors until each vector in the embedding matrix has been selected and updated.

Particular embodiments of the subject matter described in this specification can be implemented so as to realize one or more of the following advantages. In general, the embeddings improve semantic representation of data objects thereby increasing the accuracy of machine learning models in measuring semantic similarities between such data objects. Often the size of the embedding matrices due to immense number of tokens or features is a limiting factor due to high memory requirements. The techniques and methods described in this document compresses the less frequently used tokens in a way that still maintains the accuracy of the machine learning models while reducing the size of the embedding matrices, thus reducing the memory required to store embedding matrices. This provides a technical improvement in both storage requirements and processing speed. Furthermore, it allows such machine learning models to be implemented on memory constrained devices while maintaining model accuracy and performance.

The details of one or more embodiments of the subject matter described in this specification are set forth in the accompanying drawings and the description below. Other features, aspects, and advantages of the subject matter will become apparent from the description, the drawings, and the claims

BRIEF DESCRIPTION OF THE DRAWINGS

Like reference numbers and designations in the various drawings indicate like elements

DETAILED DESCRIPTION

Figure 1:
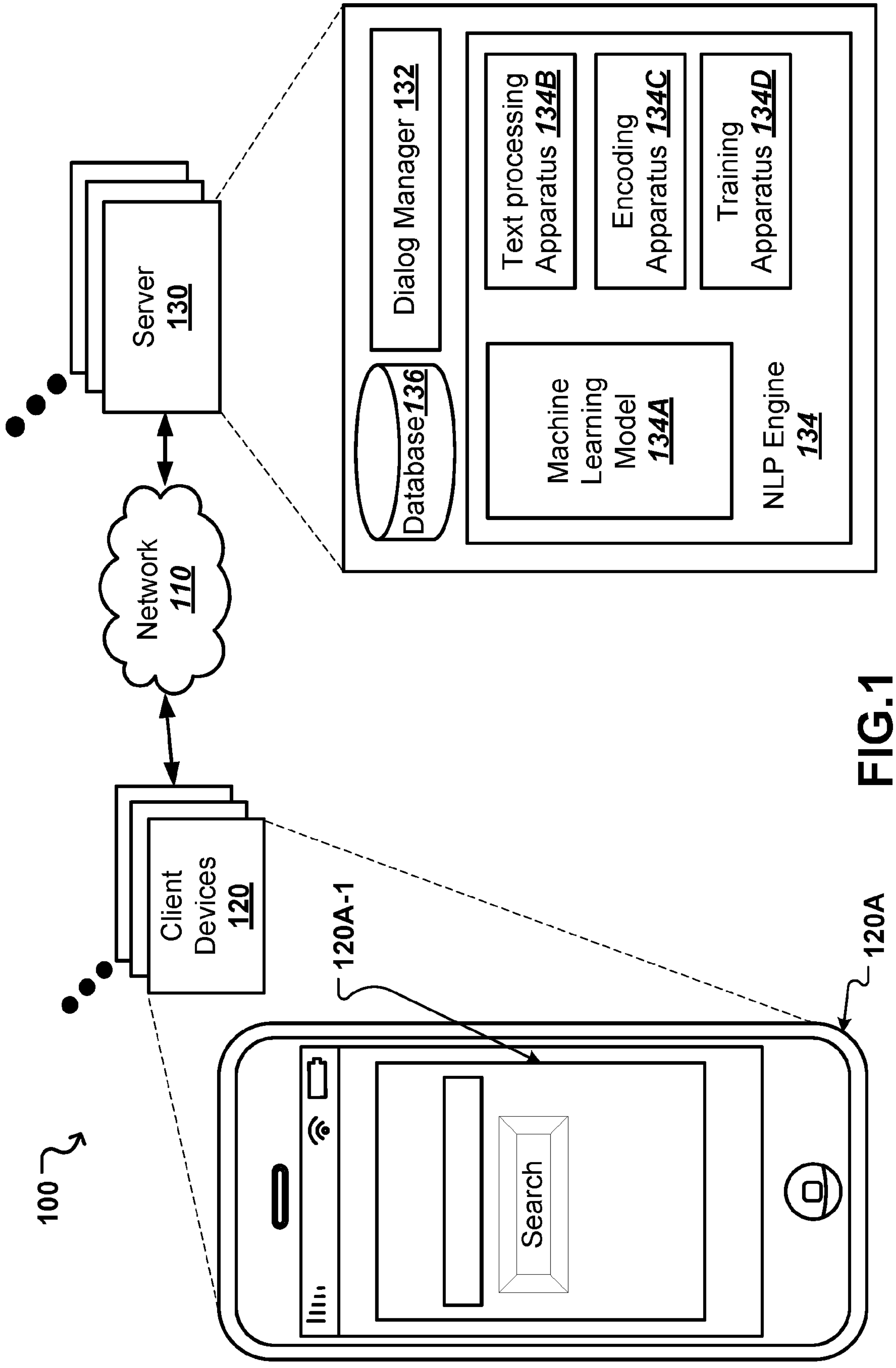
FIG. 1 is a block diagram of an example automated chat box system.

This specification relates to data processing and improving the representation of embeddings in machine learning models. Embeddings, as known in the field of machine learning, is a translation of a high-dimensional space into a low-dimensional space. Embeddings improves semantic representation of data objects and thus increases accuracy in measuring semantic similarities between such data objects. Ideally, an embedding captures some of the semantics of the input by placing semantically similar inputs close together in the embedding space. Examples of embeddings can include word embeddings that are the collective name for a set of language modeling and feature learning techniques in natural language processing (NLP) where words or phrases from a vocabulary are mapped to vectors of real numbers. For example, embeddings represents word, sentences, or other portions of textual content in a numerical representation, such as a vector representation, that machine learning algorithms are able to utilize.

To make a machine learning model understand and process the natural language, free-text words and phrases can be transformed into numeric values. One of the simplest transformation approaches is to do a one-hot encoding in which each distinct word stands for one dimension of the resulting vector and a binary value indicates whether the word presents (1) or not (0). However, one-hot encoding is impractical computationally when dealing with the entire vocabulary, as the representation demands hundreds of thousands of dimensions. Thus, word embedding is used by NLP systems as one mechanism for reasoning over natural language sentences.

Word embeddings represents words and phrases in vectors of (non-binary) numeric values with much lower and thus denser dimensions. Word embedding approximate the similarity between words or disclose hidden semantic relationships.

Other examples of embeddings can include image embeddings. Image processing systems work with datasets that represent an image with individual raw pixel intensities. However, an image in its raw dense form might not be very useful for some tasks. For example, to find photographs similar to a reference photo. Comparing the raw pixels of the input picture (e.g., an input picture with dimension 2048×2048) to another picture to find whether they are similar is neither efficient nor effective. However, extracting lower-dimensional feature vectors (embeddings) for the image provides some indication of what the image includes, and can lead to a better comparison. While the following passages describe implementations in the context of NLP, it will be appreciated that they may alternatively be applied in the context of image processing to generate more memory efficient embeddings of images/features within images and other tasks wherever applicable.

In general embeddings are represented as a matrix (referred to as embedding matrix) of dimension N×D where each row is a vector (also referred to as an embedding vector) of numeric values (integer or floating point) that corresponds to an item of a vocabulary such as a word in case of a language model or a convolution feature in case of an image model that are represented in a lower dimensional space. Given such a representation, the size of the embedding matrix is often a limiting factor. For example, if a vocabulary of words that is required to be learned by a language model includes 50,000 words and each word is represented using 300 dimensions, it would require an embedding matrix of dimension 50,000×300 individual numbers. If these numbers are floating point numbers (4 bytes), it would need 50,000×300×4 bytes=60 MB of memory requirement. However the number of words, sub-words, zip-codes, queries used in the real world is very large (in the order of billions) and it is difficult to know a priori which of the words in the vocabulary will provide the most benefit in a language model. Ideally relatively high computation power of computing systems available today, the high memory and computational requirement is not an issue. However, given today's digital environment, the end devices such as client devices (for e.g., smart phones, automated digital assistants) that have a relatively low computation power and constrained memory spaces are not capable of processing such NLP models.

As a general practice, the size of embedding matrix is controlled by capping the number of items in the vocabulary and the number of lower dimensions in the embedding matrix. For example, items with higher frequency of occurrence in the training dataset (for e.g., words in a text corpus such as newspapers, articles, journals, etc.) or in a domain where the language model is intended to be used can be represented in the embedding matrix. However, in this approach frequent items do not carry a lot of information and rare items can sometimes be extremely discriminative. In another example, if the number of dimensions is reduced it might result in a loss of information when compared to the information that is represented in the natural language.

To overcome the above mentioned problem, the techniques and methods described in this specification learns a relative importance of items to be used in a machine learning model and reformats the embedding matrix of the machine learning model in a way that reduces the memory requirements needed to store the embedding matrix. For example, an original embedding matrix of a NLP model includes vector representations of all items in a vocabulary where the items are words and/or phrases in the vocabulary that is based on a training corpus used to train the NLP model. The techniques explained later in this specification learns a relative importance of some of the items (for e.g., a proper subset of items) in the vocabulary. For example, words that are used frequently in the NLP model are given more importance compared to words that used less frequently. After learning the relative importance of the items in the NLP model, the techniques restructure the original embedding matrix into two or more new embedding matrices such that the items that are relatively important can be represented using more number of dimensions compared to other less important tokens that can be compressed to save computational time and resources. For example, the original embedding matrix can be represented using two new embedding matrices such that the first embedding matrix represents tokens that have been deemed important and the second embedding matrix includes tokens that are relatively not as important as tokens in the first embedding matrix. The techniques can further apply data compression techniques to the restructured matrices based on the relative importance of the items learned previously. For example, one approach can be to represent the tokens in the restructured embedding matrices using different number of low level dimensions based on the relative importance of the tokens in the restructured embedding matrices. For example, the embedding vectors of the first embedding matrix can be represented with more number of low-level dimensions when compared to the tokens in the second embedding matrix. The techniques and methods are described with reference to FIG. 1-3.

To facilitate an understanding of the principles and features of the present disclosure, various illustrative embodiments are explained below. In particular, the presently disclosed subject matter is described in the context of a NLP model. NLP models may be general-purpose language models, or may be application-specific. For example, a NLP model generated from a corpus of instant messages may be used to transcribe speech and to generate transcriptions for use with an instant messaging application in a client device. The present disclosure, however, is not so limited, and can be applicable in other contexts. For example, some embodiments of the present disclosure may improve other sequence recognition techniques and the like. These embodiments are contemplated within the scope of the present disclosure. Accordingly, when the present disclosure is described in the context of a language model, it will be understood that other embodiments can take the place of those referred to.

These features and additional features are described in more detail below.

FIG. 1 is a block diagram of an example chatbot system 100 in which aspects of the illustrative embodiments can be implemented. The example environment 100 includes a network 110. The network 110 can include a local area network (LAN), a wide area network (WAN), the Internet or a combination thereof. The network 110 can also include any type of wired and/or wireless network, satellite networks, cable networks, Wi-Fi networks, mobile communications networks or any combination thereof. The network 110 can utilize communications protocols, including packet-based and/or datagram-based protocols such as internet protocol (IP), transmission control protocol (TCP), user datagram protocol (UDP), or other types of protocols. The network 110 can further include a number of devices that facilitate network communications and/or form a hardware basis for the networks, such as switches, routers, gateways, access points, firewalls, base stations, repeaters or a combination thereof. The environment 100 can include additional servers, clients, and other devices not shown.

A client device 120 is an electronic device that is capable of requesting and receiving resources over the network 110. Example client devices 120 include personal computers, tablet devices, wearable devices, digital assistant devices (e.g., smart speakers), mobile communication devices, and other devices that can send and receive data over the network 110. A client device 120 typically includes a user application, such as a web browser, to facilitate the sending and receiving of data over the network 110, but native applications executed by the client device 120 can also facilitate the sending and receiving of data over the network 110. For example, 120A is an example smartphone device executing a chat application 120A-1. In some situations, the input accepted by the client devices 120 include audio (e.g., voice) input that is received through a microphone of the client device. Similarly, the output provided by the client devices 120 can be audio (e.g., synthesized speech) output that is presented using a speaker that is part of the client device.

The server 130 is a computing system specifically configured to implement a NLP model. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 130, for causing one or more hardware processors of the computing device to execute the software applications that configure the processors to perform the operations and generate the outputs described herein with regard to the illustrative embodiments. Moreover, any combination of application specific hardware, firmware, and software applications executed on hardware, or the like, may be used without departing from the spirit and scope of the illustrative embodiments.

To facilitate responding to the user, the server 130 can include a dialog manager 132, NLP engine 134 and a database 136. The dialogue manager 132 implements procedures to initiate conversations with the user and engage with the user. The NLP engine 134 implements a machine learning model 134A to understand user intent, determine responses, learn responses, and train the chatbot system 100. Structured and unstructured data can be stored in the database 136 and accessed by the NLP engine 134 and the dialogue manager 132. As readily appreciated by those of skill in the art, the dialogue manager 132, the NLP engine 134 and the database 136 can each be implemented as computer-executable code stored in computer-readable, non-volatile memory and executed by one or more processors. The dialogue manager 132 and the NLP engine 134 can be collocated or distributed as desired using suitable hardware and connections.

The NLP engine 134 can implement machine learning models and techniques, such as preprocessing techniques, pattern matching, fuzzy matching, N-grams, classifiers to further process the conversation between the user and the chatbot system 100. For example, the NLP engine 134 includes a machine learning model 134A such as a neural network that is trained to determine responses to questions. For example, in higher education or healthcare, end users usually ask similar questions (e.g., "When is the orientation?" or "What is your address?"). The neural network included in the NLP engine 134 can be trained on a training dataset that includes global set of questions with a local collection of answers for a particular industry. For example, the training dataset can include multiple training samples where each training sample is a text that describes a question and a corresponding class to which the question belongs. The local collection of answers can be accessed from the database 136 where it is stored. These answers can be stored by an administrator or they can be answers that the system 100 has learned over time. For example, the neural network of the NLP engine 134 can process a message (for e.g., a text such a question received from the user of the client device 120) and classify the message into one of the pre-determined classes and select an appropriate response for the class from the database 136 and transmit it to the dialog manager 132 for further transmission to the client device 120.

In some implementations, in order for the machine learning model 134A of the NLP engine 134 to process text in natural language, the text is pre-processed and transformed into vectors of real numbers using one of the many embedding techniques known in the art. For example, the NLP engine 134 can include a text processing apparatus 134A to identify in the text a plurality of words, individual characters and multi word sequences. Various other processing and analysis may be performed at the text processing apparatus 134A, such as correction of spelling errors in the text, using conventional automated, computer-based algorithms known to those of ordinary skill in the art. The use of spelling correction algorithms can be beneficial to improve the quality of the assessment being carried out by reducing the likelihood of complications in the assessment caused by the presence of spelling errors.

In some implementations, the NLP engine 134 can also include an encoding apparatus 134B that is configured to generate an embedding vector of values for each word in a vocabulary that is generated as output by the text processing apparatus 134A. To generate a vector, the encoding apparatus 134B can train using encoding algorithms such as skip-gram model or continuous-bag-of-words (CBOW) models on a training set such as a text corpus to generate an embedding matrix that includes a list of all words and their corresponding embeddings based on the vocabulary of the text corpus. After generating an embedding matrix, the encoding apparatus 134B can perform a look-up operation on the embedding matrix to select an embedding vector for a particular word that can be further processed by the NLP engine 130.

As mentioned before, an embedding matrix is represented as a matrix of dimension N×D where each row is a vector of numeric values (integer or floating point) that corresponds to an item in a vocabulary. Given such a representation, the size of the embedding matrix is often a limiting factor. In some implementations, the NLP engine 134 includes a training apparatus 134D that processes the embedding matrix and re-structures the matrix while training the machine learning models implemented by the NLP engine 130. For example, the machine learning model such as the neural network of the NLP engine 130 is configured to process the embedding vectors of the words in the text received from the client device 120 and classifies the text into one of the pre-determined classes. The training apparatus 134D while training the neural network, identifies words that frequently occur in the training dataset and assigns a score to the words based on their relative importance. The training apparatus 134D repeats the process during each training iteration and at the end re-structures the embedding matrix based on the scores. This is further explained with reference to FIG. 2.

Figure 2:
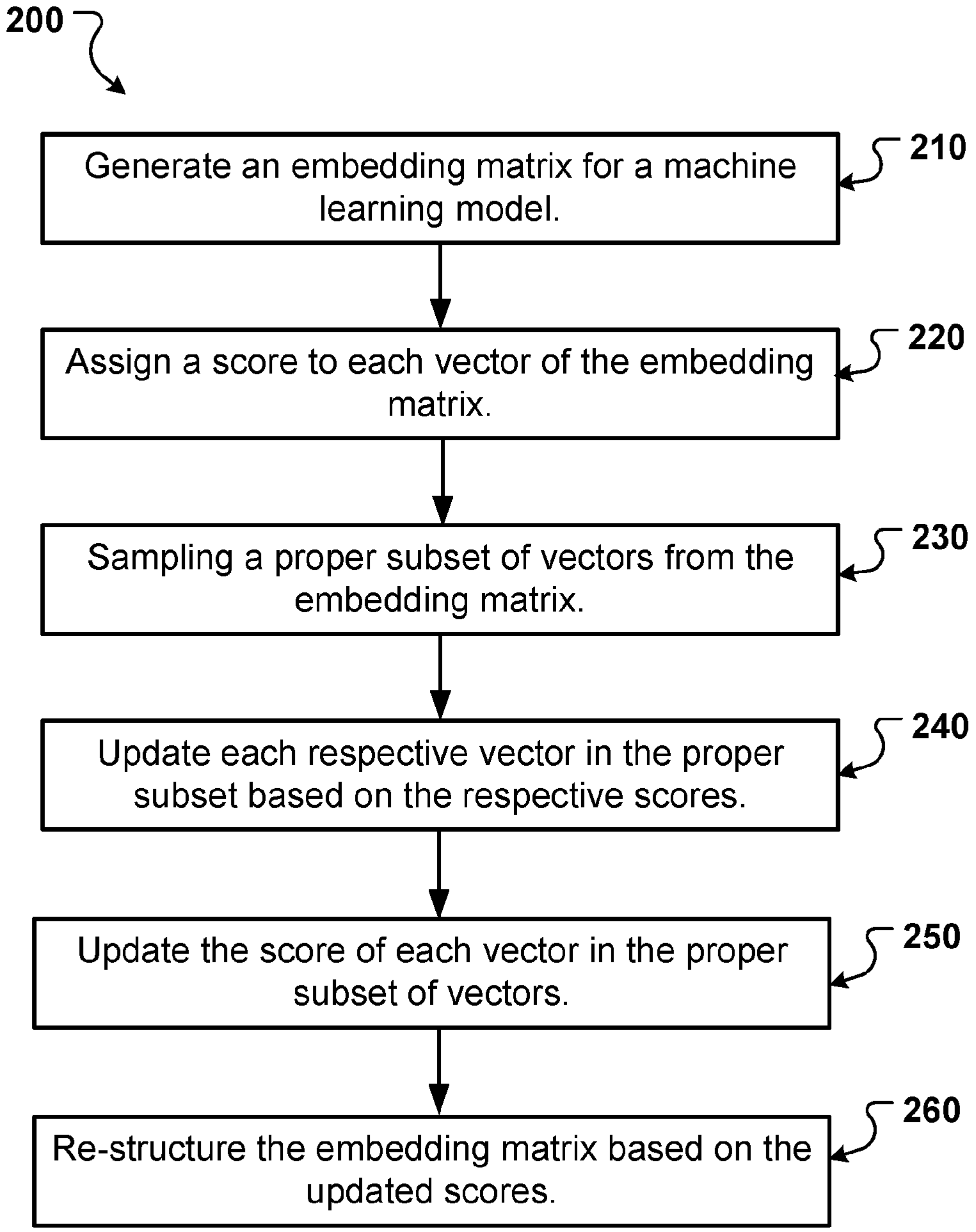
FIG. 2 is a process diagram of an example process of training a machine learning model.

FIG. 2 is a process diagram of an example process 200 of training the machine learning model of the NLP engine 130 and restructuring the embedding matrix. Operations of the process 200 can be implemented for example by the training apparatus 134D. Operations of the process 200 can also be implemented as instructions stored on one or more computer readable media which can be non-transitory, and execution of the instructions by one or more data processing apparatus can cause the one or more data processing apparatus to perform the operations of the process 200.

The encoding apparatus 134C generates an embedding matrix for a machine learning model (210). In some implementation, the encoding apparatus 134C generates an embedding matrix that includes words from a vocabulary that the machine learning model 134A may encounter while processing text. Each row in the embedding matrix is a vector of elements and corresponds to a word of a vocabulary. The vocabulary is a set of unique words used in a text corpus that be used by encoding algorithms such as skip-gram model or continuous-bag-of-words (CBOW) models to generate an embedding matrix. For example, a skip-gram model such as a Word2Vec is configured to process a large corpus of text as input and generates for each unique word in the corpus, a corresponding embedding vector in a low dimensional space. Note that the embedding vector of each unique word in a vocabulary when represented as a matrix is the embedding matrix. In such implementations, once the embedding matrix is generated it can be used by the NLP engine 134 for use with machine learning models and NLP techniques. In another implementation, the embedding matrix can be generated while training the machine learning model 134A for a particular task. In this implementation, the machine learning model 134A is trained to classify the text received from the client device 110 into one of the predetermined classes. While training the machine learning model 134A, the embedding vectors of the tokens are learned as part of a machine learning model 134A.

The training apparatus 134D assigns a score to each vector of the embedding matrix (220). The score corresponds to the word represented by the row vector. In some implementations, the training apparatus 134D assigns a score to each word in the embedding matrix that represents a probability of the word being used by the machine learning model 134A. In some implementations, the score is a value between 0 and 1 however the score can be any real number depending upon the implementation.

The training apparatus 134D selects a proper subset of vectors from the embedding matrix (230). In some implementations, the training apparatus 134D performs multiple iterations of sampling a proper subset of vectors from the embedding matrix while training the machine learning model 134A of the NLP engine 134. For example, during each training iteration of the machine learning model 134A where the machine learning model 134A is trying to optimize over a loss function L, the training apparatus 134D performs one or more iterations of sampling a proper subset of embedding vectors from the embedding matrix so as to update the embedding vectors of the proper subsets based on the words in the training set used for the corresponding training iteration of the machine learning model 134A. For example, assume that the embedding matrix has 1000 words and for each word a corresponding embedding vector. Further assume that the training set includes 100 training samples where each training sample includes a text and a corresponding true class of the text. Also assume that the training apparatus 134D uses batch optimization to learn the parameters of the machine learning model 134A with a batch size of 5 samples. In this example, training the machine learning model 134A will require 20 training iterations. During each training iteration of the machine learning model 134A, the training apparatus 134D samples a proper subset of 50 embedding vectors (assuming that the proper subset has a cardinality of 50). The training apparatus 134D can repeat the sampling process one or more times during each training iteration. For example, in case of stratified sampling, the training apparatus 134D can sample 20 times in a training iteration so as to sample each embedding vector of the embedding matrix at least once. In some implementations, the sampling process can be a random sampling where the proper subset of vectors are randomly selected.

The training apparatus 134D updates each respective vector in the proper subset of vectors based on the respective scores (240). For brevity, assume that during one of the train iterations of the machine learning model 134A, the training apparatus 134D samples a proper subset of vectors from the embedding matrix. In some implementations, the training apparatus 134D generates a mask value for each embedding vector in the proper subset based on the scores assigned to the respective embedding vector using a Gumbel Softmax Trick. The Gumbel Softmax can take the following for $$y_i = \frac{\exp\left(\frac{\log(\pi_i) + g_i}{t}\right)}{\sum_j \exp\left(\frac{(\log(\pi_j) + g_j)}{t}\right)}$$

where t is defined as a "temperature" control.

In some implementations, the mask value that is generated is a value between 0 and 1. After generating the mask value, each embedding vector of the proper subset is updated using the mask value of the embedding vector. For example, after generating the mask value based on the score assigned to a particular embedding vector in the proper subset, each value of the particular embedding vector is multiplied by the mask value. In the same way, each embedding vector in the proper subset is updated by the training apparatus 134D.

The training apparatus 134D updates the score of each vector in the proper subset of vectors (250). As known in the art, training any machine learning model requires optimizing over a loss function. In some implementations, the training apparatus 134D while training the machine learning model 134A of the NLP engine 134 adds a penalty term based on the score that was assigned to each word. The loss function L in this case can take the following form $$L = L_a + \alpha \sum_i^N p_i$$

where L_a is a task specific loss (for e.g., cross entropy) which is the loss of the machine learning model 134A, α is the regularization strength and p_i is the score assigned to the words. In this example, the machine learning model 134A such as the neural network (described above) of the NLP engine 130 is configured to process the embedding vectors of the words in the text received from the client device 120 and classifies the text into one of the predetermined classes. During each training iteration of the machine learning model 134A, as described in step 230 and 240 of the process 200, the training apparatus 134D computes the loss L based on the predictive deviation of the machine learning model 134A from the true class of the text of a training sample and the scores assigned to the words.

In some implementations, the training apparatus 134D updates the score assigned to the embedding vectors based on the loss incurred during each iteration of training the machine learning model 134A. For example, during each training iteration of the machine learning model 134A, the training apparatus 134D computes the loss L based on the predictive deviation of the machine learning model 134A from the true class of the text of a training sample and the scores assigned to the words. The training apparatus 134D can implement an optimization technique such as gradient descent that adjusts the parameters of the machine learning model 134A and the scores assigned to the words in a way that minimizes the loss L over successive iterations of the training process.

The training apparatus 134D re-structures the embedding matrix (260). After training the machine learning model 134A, the training apparatus 134D can re-structure the embedding matrix based on the updated score assigned to the words of the embedding matrix while training the machine learning model 134A. To re-structure the embedding matrix, the training apparatus 134D can generate two or more matrices where each of the two or more matrices can include disjoint sets of embedding vectors from the embedding matrix.

In this example, the training apparatus 134A can select a first set of embedding vectors from the embedding matrix to create a first embedding matrix. For example, the training apparatus 134A can select the embedding vectors with the highest scores and include the selected embedding vectors in the first embedding matrix. In some implementations, this selection of embedding vectors can be based on a threshold score value that is predetermined by the administrator of the system. For example, if the scores that are assigned and updated are values between 0 and 1, a threshold score value of 0.5 will result in the selection of embedding vectors with a score of 0.5 or more. Alternatively, the N highest scoring embedding vectors may be selected to be included in the first matrix.

Continuing with the above example, the training apparatus 134D can further create a second embedding matrix that includes embedding vectors of words that are not in the first embedding matrix. For example, if the threshold score value is 0.5, then the second embedding matrix will include embedding vectors of words that have a score less than 0.5. In some implementations, the second embedding matrix can be compressed using techniques known in the art so as to minimize the memory requirement needed to store the embedding vectors in the second embedding matrix. For example, the embedding vectors of the second embedding matrix can be represented using a lesser number of low level dimensions than the embedding vectors of the first embedding matrix.

Even though in this example, the training apparatus 134D restructures the embedding matrix into a first embedding matrix and a second embedding matrix, the training apparatus 134D can generate any number of new embedding matrices depending upon the design choice of the system. For example, the training apparatus 134D can generate four new embedding matrices using the embedding vectors of the embedding matrix such that each new embedding matrix includes a disjoint set of embedding vectors based on the threshold score values of each new matrix. In some implementations, the training apparatus 134D can even discard embedding vectors of items by not including the discarded embedding vectors in the new embedding matrices if the score of the corresponding items is lower than a minimum threshold. In other words, items in a vocabulary that are not important enough can be discarded thereby freeing up memory space that would have been used otherwise.

In some implementations, the threshold score (or the number of highest scoring embedding vectors selected to be included in the embedding matrix) may be based on a target memory requirement. The target memory requirement may be based on a memory constraint of a target device or class of devices. For example, the target memory requirement may be a pre-determined fraction of the memory available to a particular type of device. Many other examples of such memory constraints are possible.

Figure 3:
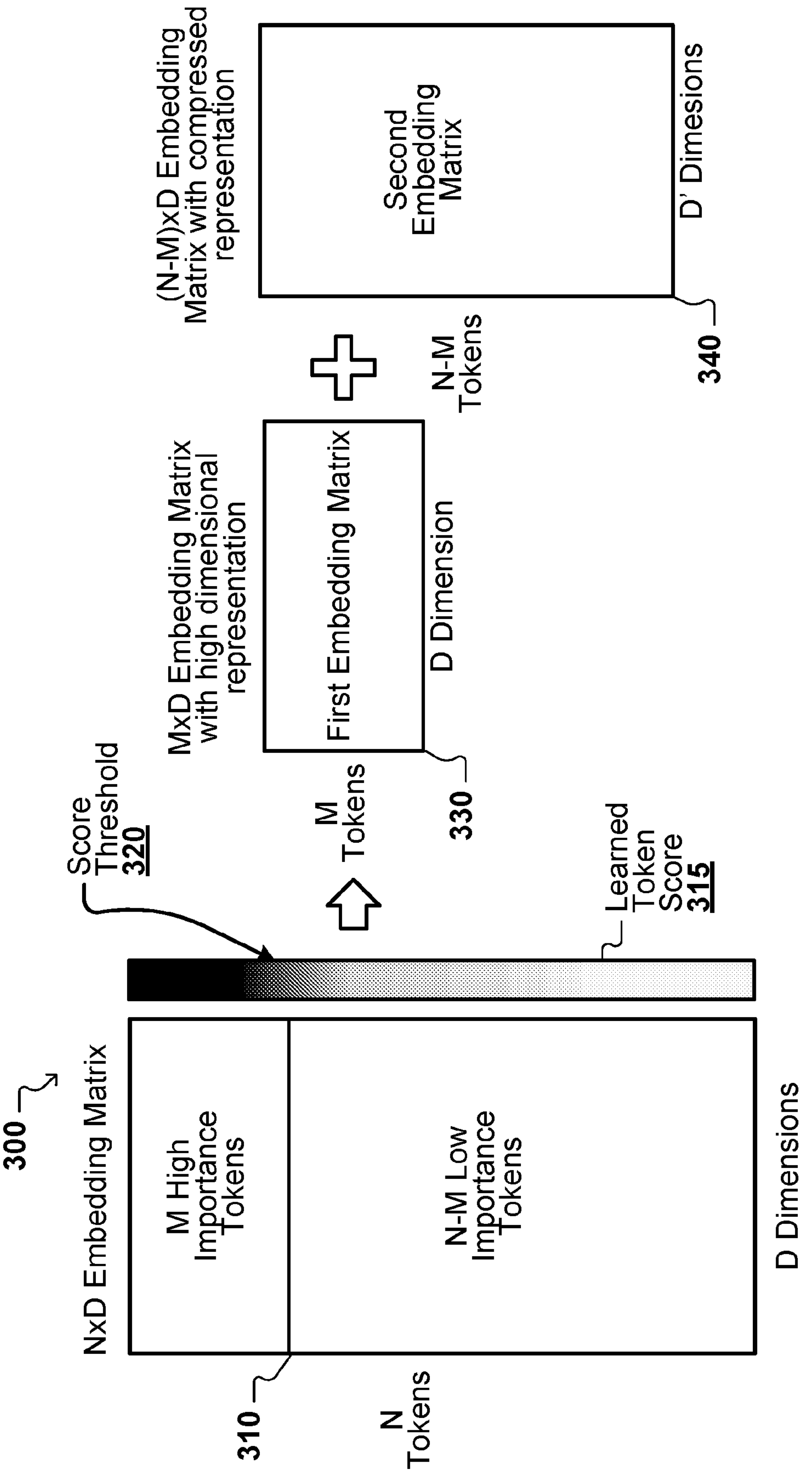
FIG. 3 is as illustration of re-structuring an example embedding matrix.

FIG. 3 is an example illustration of how the training apparatus 134D re-structures the embedding matrix. FIG. 3 shows a N×D dimensional embedding matrix 310 that includes N words each of which is represented using D low level dimensions. After training the machine learning model 134A, the training apparatus 134D computes scores 315 representing the importance of words in the machine learning model 134A and creates a first embedding matrix 330 using M embedding vectors of with the highest score (for e.g., scores above a pre-specified threshold 320 correspond to high importance words) and the second embedding matrix 340 using the remaining N-M words (e.g., lower importance words). As seen in the FIG. 3, the words in the first embedding matrix 330 are still represented using the D dimensions of the original embedding matrix 310 while the second embedding matrix is represented using lesser number of D' dimensions (D'<D) so as to minimize the overall memory requirement needed to store the first embedding matrix and the second embedding matrix.

In some implementations, instead of learning the score of each word in the vocabulary, re-structuring the embedding matrix into two or more new embedding matrix and then generating a compressed representation of the second embedding matrix, the training apparatus 134D can directly learn embedding vectors along with the compressed representations of the words. In such an implementation, the encoding apparatus 130C can generate the new embedding matrices in a way that each embedding matrix includes embedding vectors for all words of the vocabulary in a different level of compression. This is further explained with reference to FIG. 4.

Figure 4:
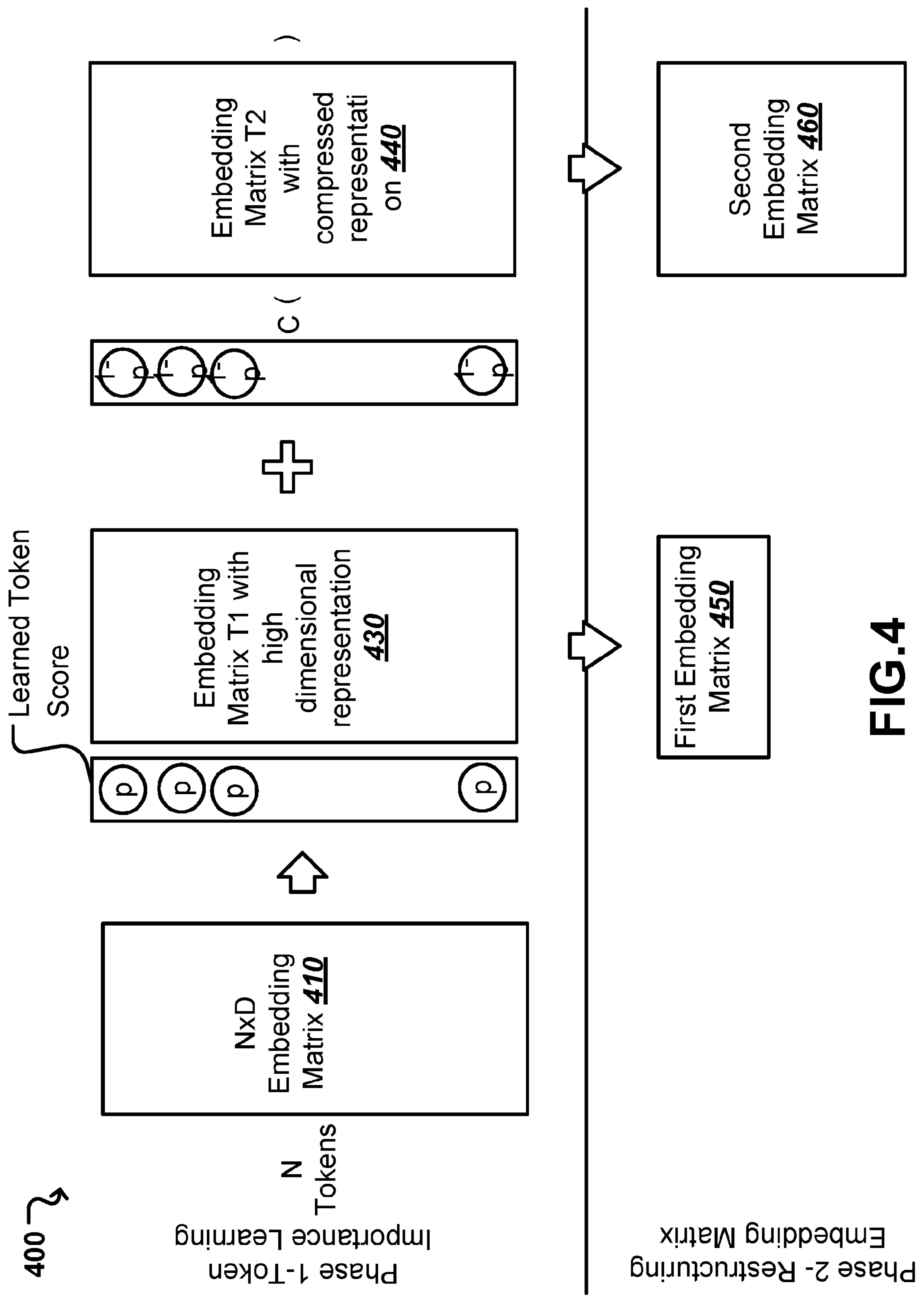
FIG. 4 is an example illustration of how the training apparatus 134D directly learns the embedding vectors along with the compressed representations of the tokens.

FIG. 4 is an example illustration of how the training apparatus 134D directly learns the embedding vectors along with compression. FIG. 4 shows two phases, phase 1 during which the training apparatus 134D learns the relative importance of words of the embedding matrix 410 and phase 2 during which the training apparatus 134D restructures the embedding matrix 410 into two matrices 460 and 470.

In some implementations, during phase 1, while training the machine learning model 134A, the model 134A can be configured to use a new embedding vector that is a combination of the high dimensional embedding vectors and compressed representations of embedding vectors. For this the training apparatus 134D can generate two embedding matrices where one of the embedding matrix includes high dimensional representation of the N words and the other matrix has a low dimensional representation of the N words. For brevity, the embedding matrix where the words are represented using a higher number of dimensions is referred to as T1 430 and the embedding matrix where the words are represented using a lower number of dimensions or a compressed representation is referred to as T2 440. Note that both T1 and T2 include embedding vectors of the same words as the embedding matrix 410. While training the machine learning model 134A, the training apparatus 134D can generate a new embedding vector for a word from the embedding vectors of the respective words from T1 430 and T2 440. To generate the new embedding vectors, the respective embedding vectors from T1 430 and T2 440 can be combined based on a score that is assigned to each word. For example, the new embedding vector can be generated according to the following equation $$\text{New Embedding Vector } (x) = p * T1(x) + (1-p) * T2(x)$$

where x is a word, p is the score assigned to the word and where T1(*x*) and T2(*x*) are the respective embedding vectors of the word x from embedding matrices T1 and T2 respectively. It should be noted that while training the machine learning model 134A, the training apparatus 134D learns the parameters of the machine learning model 134A along with the scores assigned to each word.

In some implementations, during phase 2, after training the machine learning model 134A, the training apparatus 134D can re-structure each of the embedding matrices T1 and T2 according to the scores learned during the training process. For example, the training apparatus 134D can discard embedding vectors of words having a lower score from the embedding matrix T1 and retain the remaining embedding vectors of words with a high score. Simultaneously, the training apparatus 134D can discard the embedding vectors of words that were retained in T1 and retain embedding vectors of words that were discarded from T1 thereby avoiding multiple embedding vectors for a same word and reducing memory requirement needed to store T1 and T2. For example, after restructuring the embedding matrix T1, retaining the embedding vectors of words with a high score (for e.g., by retaining embedding vectors with scores above a pre-specified threshold), the training apparatus 134D generates a first embedding matrix 450. Similarly, by retaining the embedding vectors of words that were discarded while generating the first embedding matrix 450, the training apparatus 134D generates a second embedding matrix 460.

Figure 5:
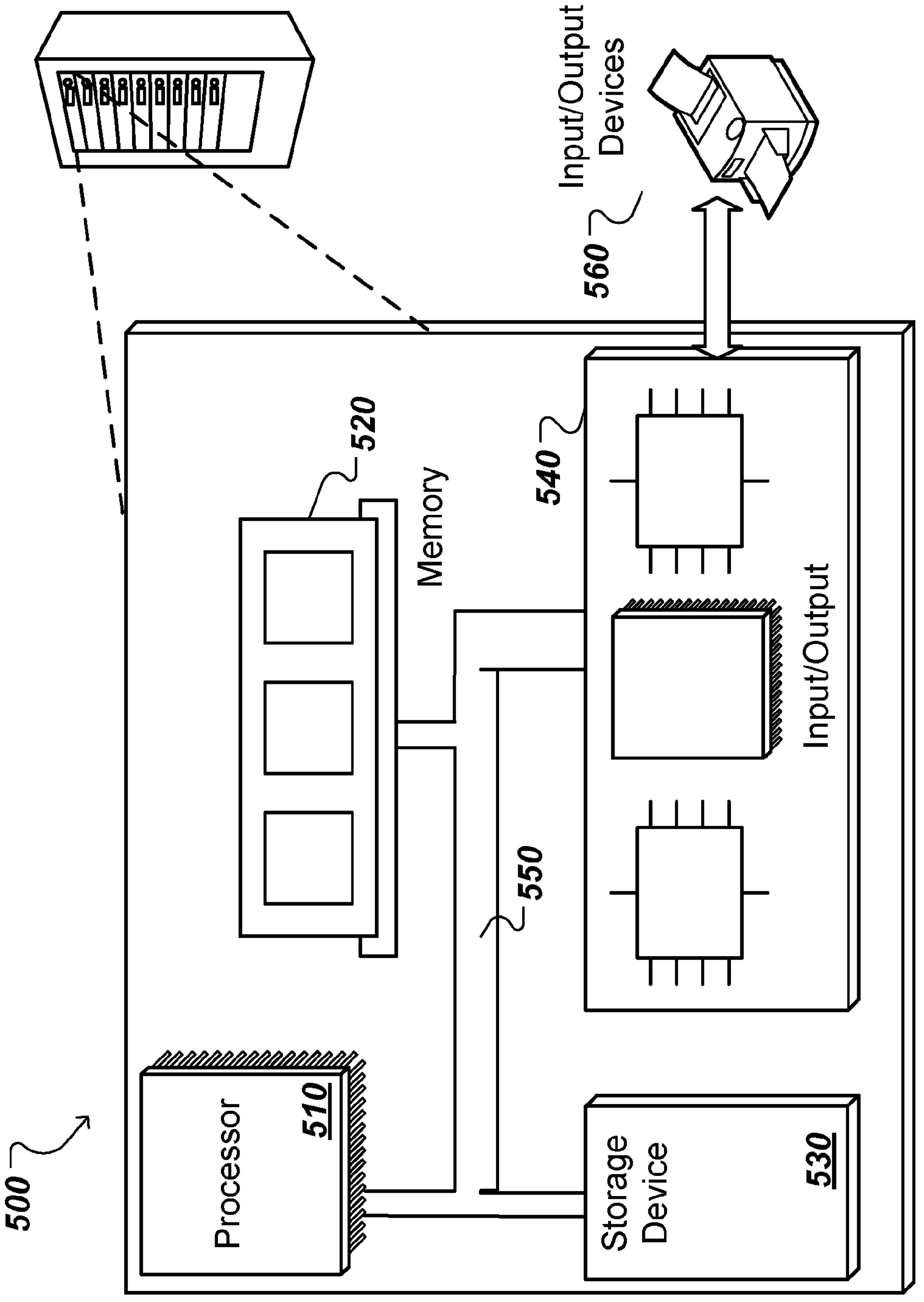
FIG. 5 is a block diagram of an example computer system.

FIG. 5 is block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 410 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 570. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method, comprising: generating an embedding matrix for a machine learning model, the embedding matrix defining a plurality of rows, wherein each row in the embedding matrix is a vector of elements and corresponds to an item of a vocabulary; assigning, to each vector in the embedding matrix, a score, each score being a probability of its corresponding vector being used in the machine learning model; updating vectors in the embedding matrix, wherein the updating comprises iteratively processing the vectors of the embedding matrix, and for each iteration: sampling, from the vectors of the embedding matrix, a proper subset of vectors for the iteration; updating the elements of each respective vector in the proper subset of vectors based on the respective scores of the proper subset of vectors; updating the score of each vector in the proper subset of vectors based on a loss function of the machine learning model; and re-structuring the embedding matrix based on the updated scores of the vectors in the embedding matrix; wherein for a plurality of the iterations, different proper subsets of vectors are selected; and wherein updating the vectors comprises performing additional iterations on additional proper subsets of vectors until each vector in the embedding matrix has been selected and updated.

2. The computer-implemented method of claim 1, wherein updating the elements of each respective vector in the proper subset of vectors comprises: sampling a value based on the score of the respective vector; and multiplying each element in the vector by the value.

3. The computer-implemented method of claim 2, wherein sampling the value comprises sampling using Gumbel Softmax Trick based on the score.

4. The computer-implemented method of claim 1, wherein re-structuring the embedding matrix comprises:

identifying a first proper subset of vectors from the vectors in the embedding matrix based on the score of each vector;

creating a first embedding matrix that comprises the first proper subset of vectors; and creating a second embedding matrix that comprises vectors from the embedding matrix that are not in the first proper subset of vectors.

5. The computer-implemented method of claim 4, wherein:

the first embedding matrix is not a compressed representation of the first proper subset of vectors from the embedding matrix; and the second embedding matrix is a compressed representation of the vectors from the embedding matrix that are not in the first proper subset of vectors.

6. The computer-implemented method of claim 1, wherein a training process of the machine learning model includes a loss function L that can be represented as $$L = L_a + \alpha \sum_i^N p_i$$

where $L_a$ is a task specific loss of the machine learning model, $\alpha$ is a regularization parameter and $p_i$ is the score of the i-th item among the N items of the embedding matrix during a training step.

7. A system, comprising: one or more processors; and one or more storage devices storing instructions that, when executed by the one or more processors, cause the one or more processors to perform operations comprising:

generating an embedding matrix for a machine learning model, the embedding matrix defining a plurality of rows, wherein each row in the embedding matrix is a vector of elements and corresponds to an item of a vocabulary; assigning, to each vector in the embedding matrix, a score, each score being a probability of its corresponding vector being used in the machine learning model; updating vectors in the embedding matrix, wherein the updating comprises iteratively processing the vectors of the embedding matrix, and for each iteration: sampling, from the vectors of the embedding matrix, a proper subset of vectors for the iteration; updating the elements of each respective vector in the proper subset of vectors based on the respective scores of the proper subset of vectors; updating the score of each vector in the proper subset of vectors based on a loss function of the machine learning model; and re-structuring the embedding matrix based on the updated scores of the vectors in the embedding matrix; wherein for a plurality of the iterations, different proper subsets of vectors are selected; and wherein updating the vectors comprises performing additional iterations on additional proper subsets of vectors until each vector in the embedding matrix has been selected and updated.

8. The system of claim 7, wherein updating the elements of each respective vector in the proper subset of vectors comprises:

sampling a value based on the score of the respective vector; and multiplying each element in the vector by the value.

9. The system of claim 8, wherein sampling the value comprises sampling using Gumbel Softmax Trick based on the score.

10. The system of claim 7, wherein re-structuring the embedding matrix comprises:

identifying a first proper subset of vectors from the vectors in the embedding matrix based on the score of each vector;

creating a first embedding matrix that comprises the first proper subset of vectors; and creating a second embedding matrix that comprises vectors from the embedding matrix that are not in the first proper subset of vectors.

11. The system of claim 10, wherein:

the first embedding matrix is not a compressed representation of the first proper subset of vectors from the embedding matrix; and the second embedding matrix is a compressed representation of the vectors from the embedding matrix that are not in the first proper subset of vectors.

12. The system of claim 7, wherein a training process of the machine learning model includes a loss function L that can be represented as $$L = L_a + \alpha \sum_i^N p_i$$

where $L_a$ is a task specific loss of the machine learning model, α is a regularization parameter and $p_i$ is the score of the i-th item among the N items of the embedding matrix during a training step.

13. A non-transitory computer readable medium storing instructions that, when executed by one or more data processing apparatus, cause the one or more data processing apparatus to perform operations comprising: generating an embedding matrix for a machine learning model, the embedding matrix defining a plurality of rows, wherein each row in the embedding matrix is a vector of elements and corresponds to an item of a vocabulary; assigning, to each vector in the embedding matrix, a score, each score being a probability of its corresponding vector being used in the machine learning model; updating vectors in the embedding matrix, wherein the updating comprises iteratively processing the vectors of the embedding matrix, and for each iteration: sampling, from the vectors of the embedding matrix, a proper subset of vectors for the iteration; updating the elements of each respective vector in the proper subset of vectors based on the respective scores of the proper subset of vectors; updating the score of each vector in the proper subset of vectors based on a loss function of the machine learning model; and re-structuring the embedding matrix based on the updated scores of the vectors in the embedding matrix; wherein for a plurality of the iterations, different proper subsets of vectors are selected; and wherein updating the vectors comprises performing additional iterations on additional proper subsets of vectors until each vector in the embedding matrix has been selected and updated.

14. The non-transitory computer readable medium of claim 13, wherein updating the elements of each respective vector in the proper subset of vectors comprises:

sampling a value based on the score of the respective vector; and multiplying each element in the vector by the value.

15. The non-transitory computer readable medium of claim 14, wherein sampling the value comprises sampling using Gumbel Softmax Trick based on the score.

16. The non-transitory computer readable medium of any preceding claim 13, wherein re-structuring the embedding matrix comprises:

identifying a first proper subset of vectors from the vectors in the embedding matrix based on the score of each vector;

creating a first embedding matrix that comprises the first proper subset of vectors; and creating a second embedding matrix that comprises vectors from the embedding matrix that are not in the first proper subset of vectors.

17. The non-transitory computer readable medium of claim 16, wherein:

the first embedding matrix is not a compressed representation of the first proper subset of vectors from the embedding matrix; and the second embedding matrix is a compressed representation of the vectors from the embedding matrix that are not in the first proper subset of vectors.

18. The non-transitory computer readable medium of claim 13, wherein a training process of the machine learning model includes a loss function L that can be represented as $$L = L_a + \alpha \sum_i^N p_i$$

where $L_a$ is a task specific loss of the machine learning model, α is a regularization parameter and $p_i$ is the score of the i-th item among the N items of the embedding matrix during a training step.

* * * * *